(12) United States Patent
Tejerina et al.

(10) Patent No.: US 9,672,349 B2
(45) Date of Patent: Jun. 6, 2017

(54) MULTIPLE-KEY FEATURE TOGGLES FOR COMPLIANCE

(71) Applicant: Microsoft Corporation, Redmond, WA (US)

(72) Inventors: David Nunez Tejerina, Bellevue, WA (US); Arthur James Schwab, III, Redmond, WA (US); Paul Mattson, Redmond, WA (US); Erik Adams, Bellevue, WA (US); Craig Farris, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 78 days.

(21) Appl. No.: 14/329,863

(22) Filed: Jul. 11, 2014

(65) Prior Publication Data

US 2016/0012219 A1   Jan. 14, 2016

(51) Int. Cl.
G06F 7/04 (2006.01)
G06F 21/50 (2013.01)
G06F 21/60 (2013.01)
G06Q 10/00 (2012.01)

(52) U.S. Cl.
CPC .............. *G06F 21/50* (2013.01); *G06F 21/60* (2013.01); *G06Q 10/00* (2013.01); *G06F 2221/034* (2013.01)

(58) Field of Classification Search
CPC .................................. G06F 21/10; G06F 21/31
USPC ......................................................... 726/26
See application file for complete search history.

(56) References Cited

U.S. PATENT DOCUMENTS

| | | | |
|---|---|---|---|
| 7,234,065 B2 | 6/2007 | Breslin et al. | |
| 7,523,135 B2 | 4/2009 | Bradford et al. | |
| 8,639,592 B1 | 1/2014 | Rouse et al. | |
| 2007/0038443 A1* | 2/2007 | Thyssen ................. | H04M 1/80 704/233 |
| 2009/0100498 A1 | 4/2009 | Grossi et al. | |
| 2012/0004945 A1 | 1/2012 | Vaswani | |
| 2012/0117157 A1 | 5/2012 | Ristock | |
| 2013/0290200 A1 | 10/2013 | Singhal et al. | |

(Continued)

FOREIGN PATENT DOCUMENTS

WO       0248943 A1    6/2002

OTHER PUBLICATIONS

"Accelus Compliance Manager", Published on: Sep. 4, 2013 Available at: http://accelus.thomsonreuters.com/products/accelus-compliance-manager.

(Continued)

*Primary Examiner* — Anthony Brown
(74) *Attorney, Agent, or Firm* — Turk IP Law, LLC (57) ABSTRACT

A cloud service system may activate features or functionality based on agreement of at least two parties such as a system administrator and a compliance officer to mitigate compliance, security, or privacy impact on the service. The controllers may make the "enable feature" decision independently, but still have equal say in the outcome. In some examples, pre-established profiles may be provided to a controller such as a compliance officer to make decisions by selection on his/her behalf at a particular level of risk acceptance and/or to meet a particular regulatory standard/certification.

19 Claims, 6 Drawing Sheets

(56) References Cited

U.S. PATENT DOCUMENTS

2013/0298242 A1 11/2013 Kumar et al.
2013/0340092 A1* 12/2013 Kamphuis ............. G06F 21/105
726/27

OTHER PUBLICATIONS

"International Search Report and Written Opinion Issued in PCT Application No. PCT/US2015/039281", Mailed Date: Oct. 12, 2015, 11 Pages.

"International Preliminary Report on Patentability Issued in PCT Application No. PCT/US2015/039281", Mailed Date: Sep. 16, 2016, 8 Pages.

* cited by examiner

MULTIPLE-KEY FEATURE TOGGLES FOR COMPLIANCE

BACKGROUND

Features and/or functionality of cloud services may have compliance, security, and/or privacy impacts (e.g., a feature that synchronizes customer data to a social network may mean that data leaves the service provider's privacy scope and may be under the social network's privacy scope). The compliance, security, and privacy implications of such features may be complex and customer organizations may have someone (a compliance officer) whose job it is to understand these impacts to their business. Even if a feature can be disabled by a customer, the person who makes that decision is typically a system administrator, who may not understand the compliance, security, privacy impacts. This may lead to a situation where the system administrator turns on a feature which increases compliance risk without the compliance officer being aware, either because the compliance officer does not understand what risk the feature might pose, or because the system administrator acts without consulting the compliance officer.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

According to some examples, a method executed on a computing device to provide multiple-key feature toggling for compliance in a service is described. The method may include determining a feature of the service with controlled activation; receiving a first input from a first controller for activation of the feature; receiving a second input from a second controller for the activation of the feature; and rendering a decision on the activation of the feature based on the first input and the second input.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a system according to embodiments may activate features or functionality based on agreement of at least two parties such as a system administrator and a compliance officer to mitigate compliance, security, or privacy impact on the service. The controllers may make the "enable feature" decision independently, but still have independent say in the outcome. The decisions of the controllers may be treated equally or in a weighted fashion. For example, the system administrator's input may be weighted 30% and the compliance officer's input may be 70%. Of course other weighting schemes for multiple controllers may also be implemented. In some examples, pre-established profiles may be provided to a controller such as a compliance officer to make decisions by selection on his/her behalf at a particular level of risk acceptance and/or to meet a particular regulatory standard/certification.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide multiple-key feature toggles for compliance and privacy in cloud based services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
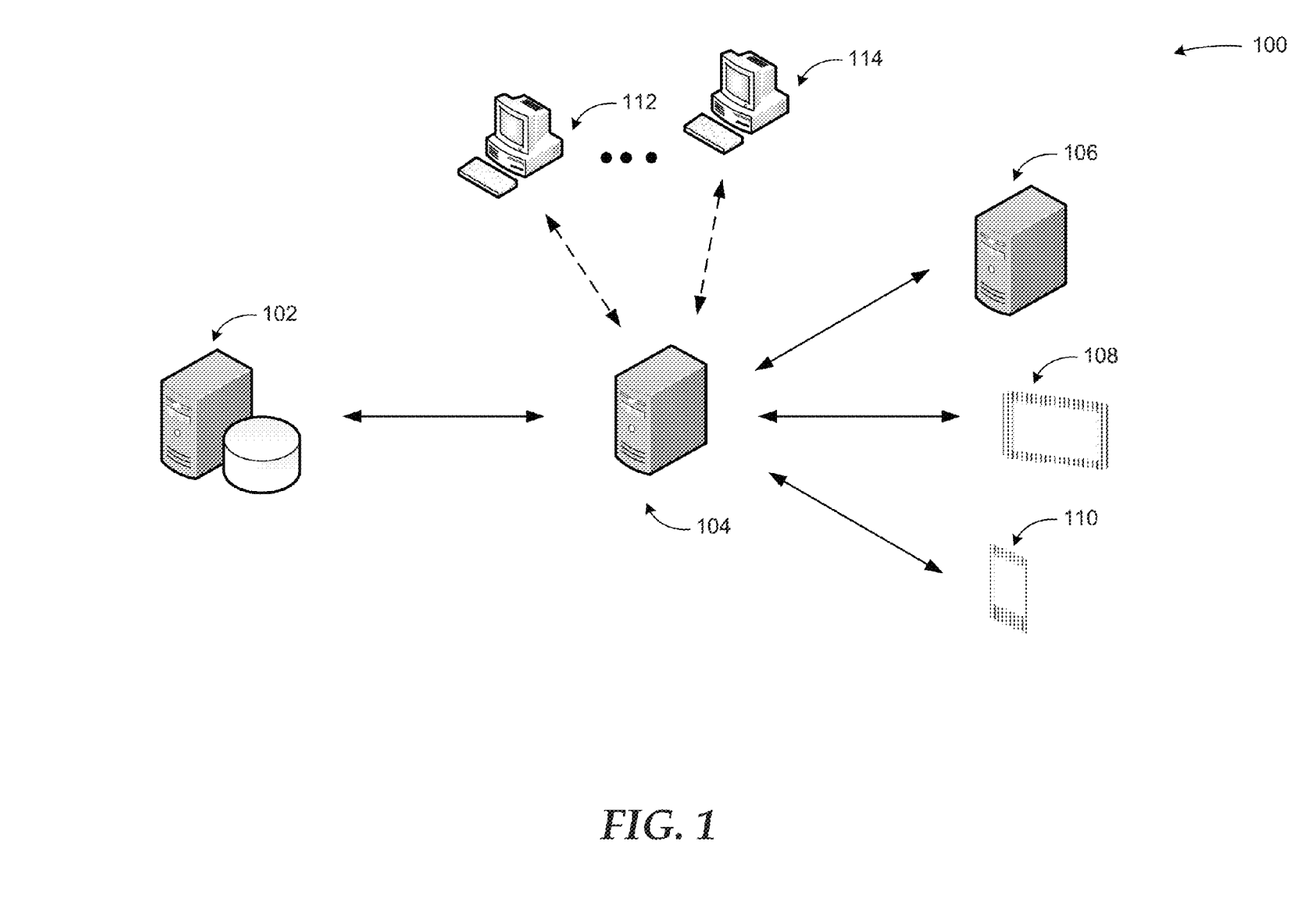
FIG. 1 is a conceptual diagram illustrating an example cloud service, where activation of features or functionality may be controlled by at least two parties, according to embodiments.

FIG. 1 is a conceptual diagram illustrating an example cloud service, where activation of features or functionality may be controlled by at least two parties, according to embodiments.

As shown in diagram 100, a server 104, representing a plurality of servers, may provide cloud services. The cloud services may include variety of applications including web services, reporting services, financial services, and similar ones. Consumers of the cloud service may access it through client devices such as tablet 108 or smart phone 110. In other configurations, the cloud service may be accessed by a server 108 of a consuming entity, which in turn may provide the service to its clients (users). The server 104 may operate in conjunction with a number of data storage systems represented by database server 102.

Consumers of the cloud service and/or regulatory authorities may demand compliance with security, privacy, storage, or other requirements. Some cloud services may provide certification documents associated with provided services such as storage policy certification, security policy certification, and similar ones. However, a compliant service may add a feature or functionality that may be outside the scope of its compliance policy, security policy, or privacy policy. For example, a feature that synchronizes customer data with a collaboration service may mean that data leaves the service provider's security scope and may be under the collaboration service's security scope.

People or entities with different characteristics may have varying levels of understanding of the features and functionalities, and their impacts on compliance, security, privacy policies of the service. For example, a systems administrator may understand the technical aspects of a feature, while a compliance officer may be knowledgeable on policy aspects and regulatory requirements. Thus, giving one person control over activation of new features and functionality (or even disabling of existing features or functionality) may result in undesired impact on service policies.

In a system according to embodiments, at least two controllers 112, 114 (people or entities) may make independent decisions on activation of new features or functionality (or disabling of existing features or functionality), and the activation may be implemented as a result of those decisions (if they both match, for example).

While the example system in FIG. 1 has been described with specific components including controllers 112 and 114, who may be a compliance officer and a system administrator, embodiments are not limited to these components or system configurations and can be implemented with other system configuration employing fewer or additional components. Furthermore, embodiments are not limited to compliance, validation, and trust based schemes. The approaches discussed here may be applied to any compliance process for any services provided by an application and/or a server using the principles described herein.

Figure 2:
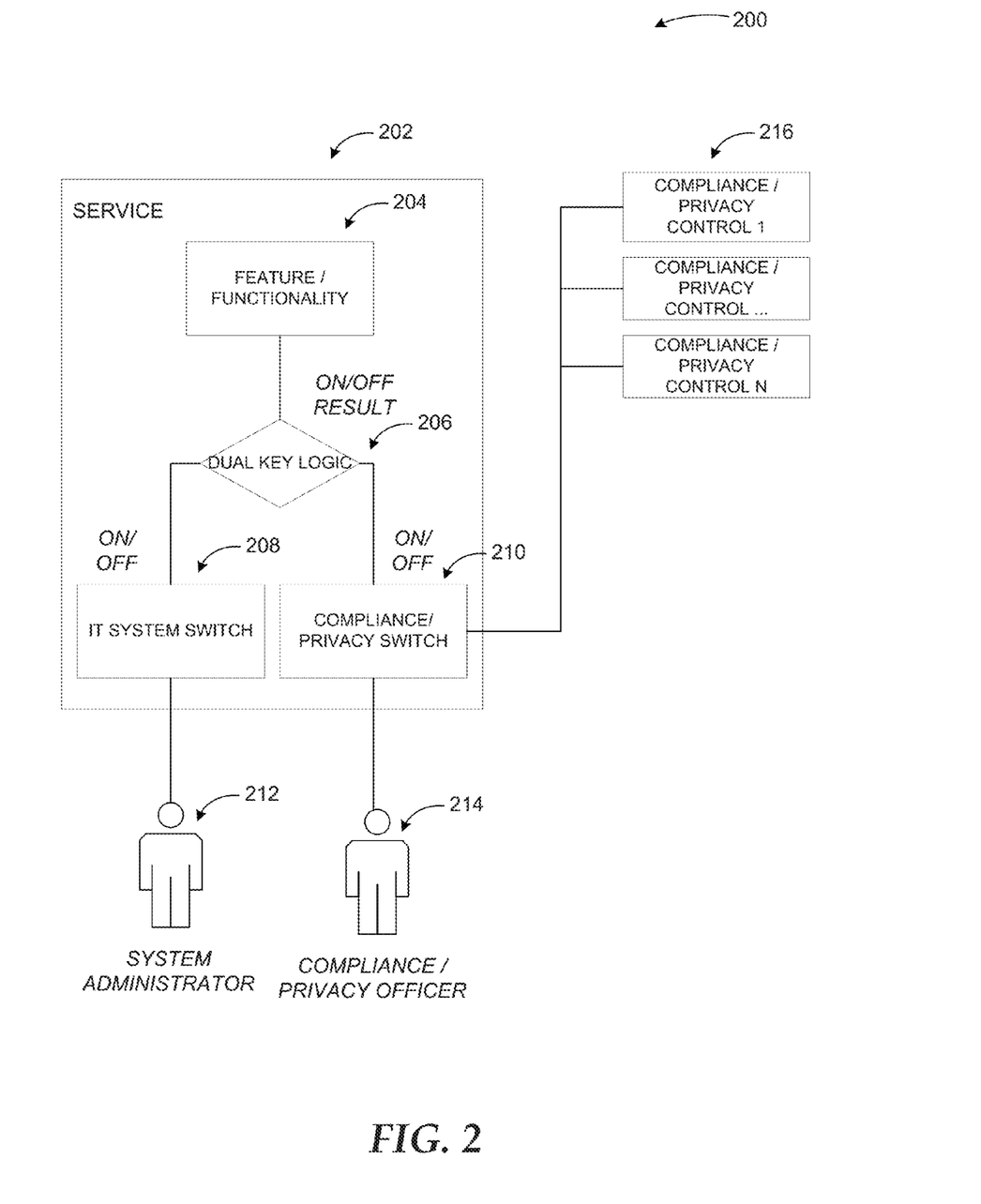
FIG. 2 illustrates an example scheme to provide multiple-key feature toggles for compliance, security, and privacy concerns, according to embodiments.

FIG. 2 illustrates an example scheme to provide multiple-key feature toggles for compliance, security, and privacy concerns, according to embodiments.

As shown in diagram 200, features and functionality in a cloud service 202 may be made to function or not function for each customer organization. Each feature or functionality may have a known compliance, security, and/or privacy impact. This may be codified by the service provider in one or more compliance/privacy controls 216. Each feature or functionality may be associated with two switches. An IT system switch 208 may be used by a system administrator 212 who may understand the system impact of turning on this feature or functionality, for example. A compliance switch 210 may be used by a compliance officer 214, who may understand the impact of turning on this feature or functionality based on the impacted controls linked to this feature or functionality by the service 202. The assigning of which individuals are allowed to toggle each switch may be decided by the customer organization in some embodiments.

Each service feature or functionality may also be associated with a logic module 206, which may use the input of the two switches as well as possibly other inputs to determine if the service feature actually functions for a particular customer organization. For example, the feature or functionality may not be activated for a customer until both the system administrator and the compliance officer both have turned their switches to ON; and the feature or functionality may stop functioning for that customer organization if either of these switches is turned OFF.

While the example configuration in diagram 200 includes two control switches, embodiments are not limited to two switch controls. Any number of switches may be used to control activation or disabling of features and functionalities. For example, a regulatory agency representative, a customer representative, etc. may also provide input to the decision making process in addition to a system administrator and a compliance officer. In another example, a finance officer may provide input for decisions about features and functionality involving financial data. Thus, the number and/or types of controllers may be determined based on type of feature or functionality that is being turned on or off, as well as type of data that may be impacted by the feature or functionality.

In yet other embodiments, the decision making process based on the switch inputs may include functions other than an AND combination. For example, a default decision for activation of a feature may be OFF unless all parties agree. In some case other Boolean functions such as XOR may even be used. The logic combination of the switch inputs may also be configurable based on customer, feature or functionality type, potentially impacted compliance policies, and so on.

In further embodiments, disabling of an already active feature or functionality may be controlled in a similar way as discussed above for activation of new features and functionalities. For example, an active filtering feature of a service may exclude sensitive data from data being transferred to other services as part of the service's security policy. By turning off the filtering feature, the service's security policy may be impacted. Thus, disabling of the filtering feature may be controlled through a two or more key toggle system as discussed above.

Figure 3:
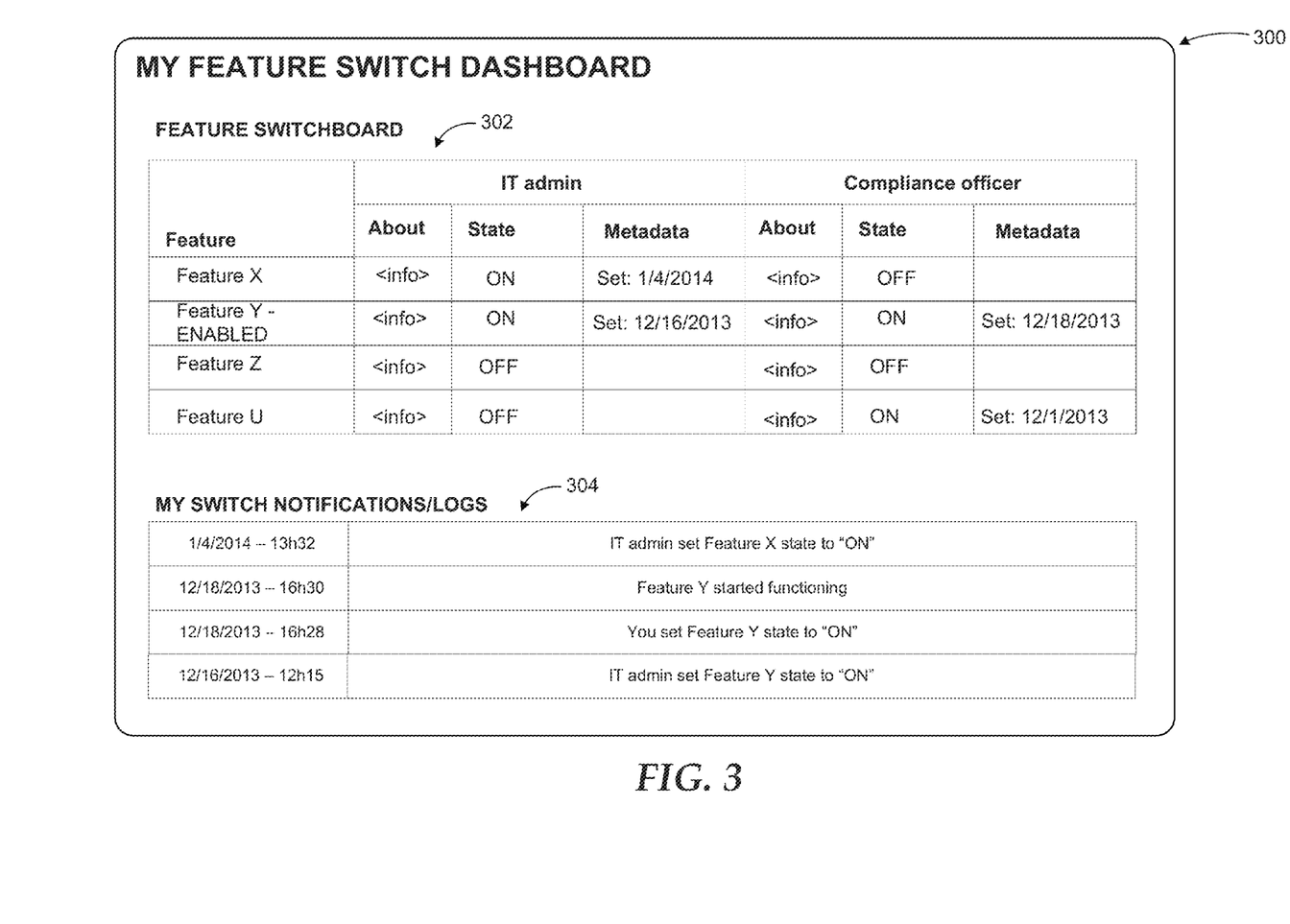
FIG. 3 illustrates an example user interface providing control information associated with multiple-key feature toggles for compliance, security, and privacy concerns, according to embodiments.

FIG. 3 illustrates an example user interface providing control information associated with multiple-key feature toggles for compliance, security, and privacy concerns, according to embodiments.

As shown in diagram 300, a user interface may provide to the controlling parties (e.g., the system administrator and the compliance officer) a dashboard that lets them see the features that can be switched ON or OFF, and the status of both switches for each feature 302. The dashboard may also include notifications and records associated with switching 304, for example, when another switch for a feature has been changed by whom or that a feature has been enabled by the logic module. A switch owner (system administrator or compliance officer) may see all switches, but may be allowed to change the state of their own switch only in some embodiments. For example, the compliance officer may see both switches for Feature Y, but may only be allowed to change the state of the compliance switch for Feature Y. This configuration may provide different roles full visibility into the approval and enabled/disabled status of the features, but limit their input on their area of responsibility.

In case of multiple controllers, the visibility to other switches states or other metadata may be restricted based on roles of the controllers. For example, if a customer representative is allowed to have a switch for certain types of features or functionality, that customer representative may not be allowed to see information associated with switches for which they have no input (control). The restriction of displayed information may be extended to types of metadata as well. For example history of when a switch was changed by whom may be restricted to certain controllers.

In an example scenario, there may be two user experiences for the compliance officer—the first may display all available features and the compliance officer may select each one. An alternate user experience may be employed for compliance officers with less technical finesse or who want a simpler experience. In the latter case, the compliance officer may select which certification they want to enforce, and the system may toggle features on the compliance officer's behalf, based on the compliance controls that the feature impacts. For example, if the compliance officer selects "Enforce HIPAA", then the system may automatically toggle off all features that impact HIPAA, and keep them in an off state.

The example scenarios and schemas in FIGS. 2 and 3 are shown with specific components, data types, and configurations. Embodiments are not limited to systems according to these example configurations. Multiple-key feature toggling for compliance may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
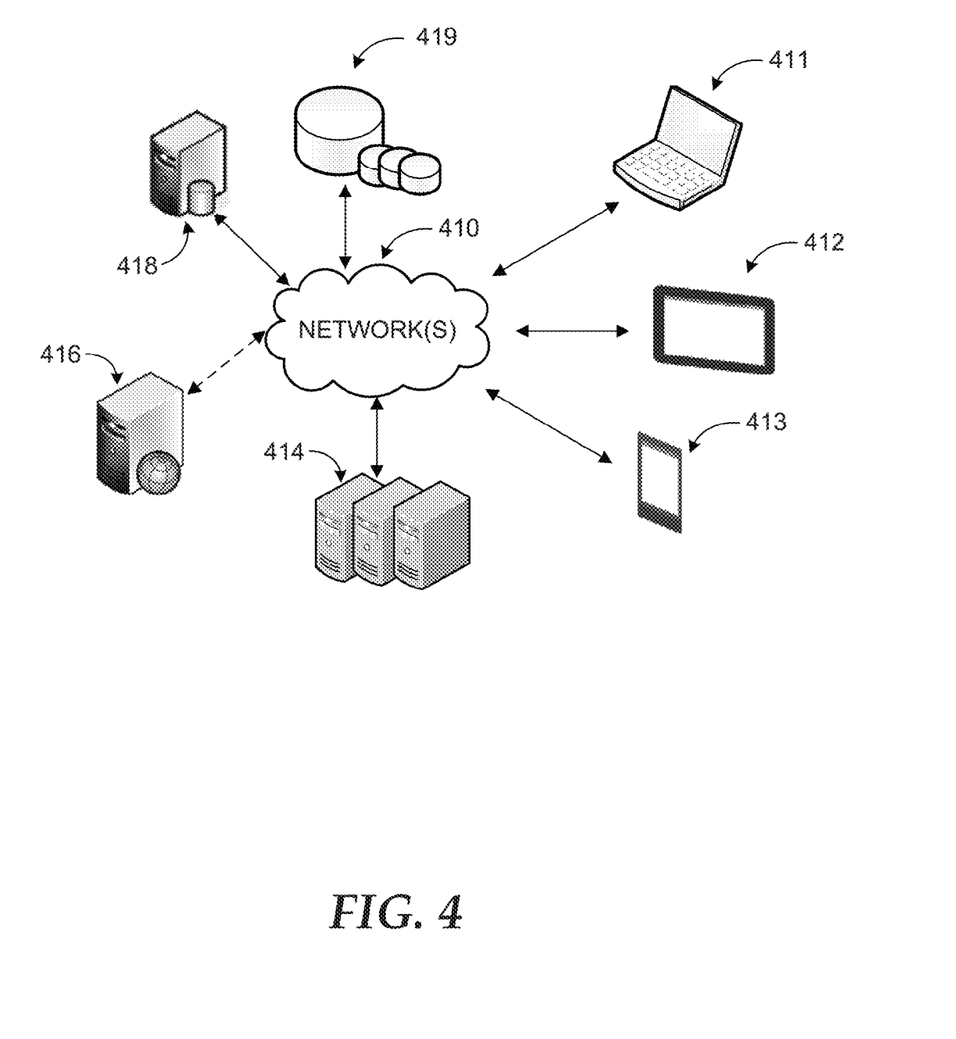
FIG. 4 is a simplified networked environment, where a system according to embodiments may be implemented.

FIG. 4 is an example networked environment, where embodiments may be implemented. A system providing multiple-key feature toggling for compliance in cloud services may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. A control module of the service responsible for compliance issues and activation or disabling of features and functionality may manage features and functionality based on input from independent controllers and provide a user experience displaying information associated with switch states, feature states, and history of changes. The control module may store the updates or additional data associated with the feature activation information in data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide multiple-key feature toggling for compliance. Furthermore, the networked environments discussed in FIG. 4 are for illustration purposes only. Embodiments are not limited to the example applications, modules, or processes.

Figure 5:
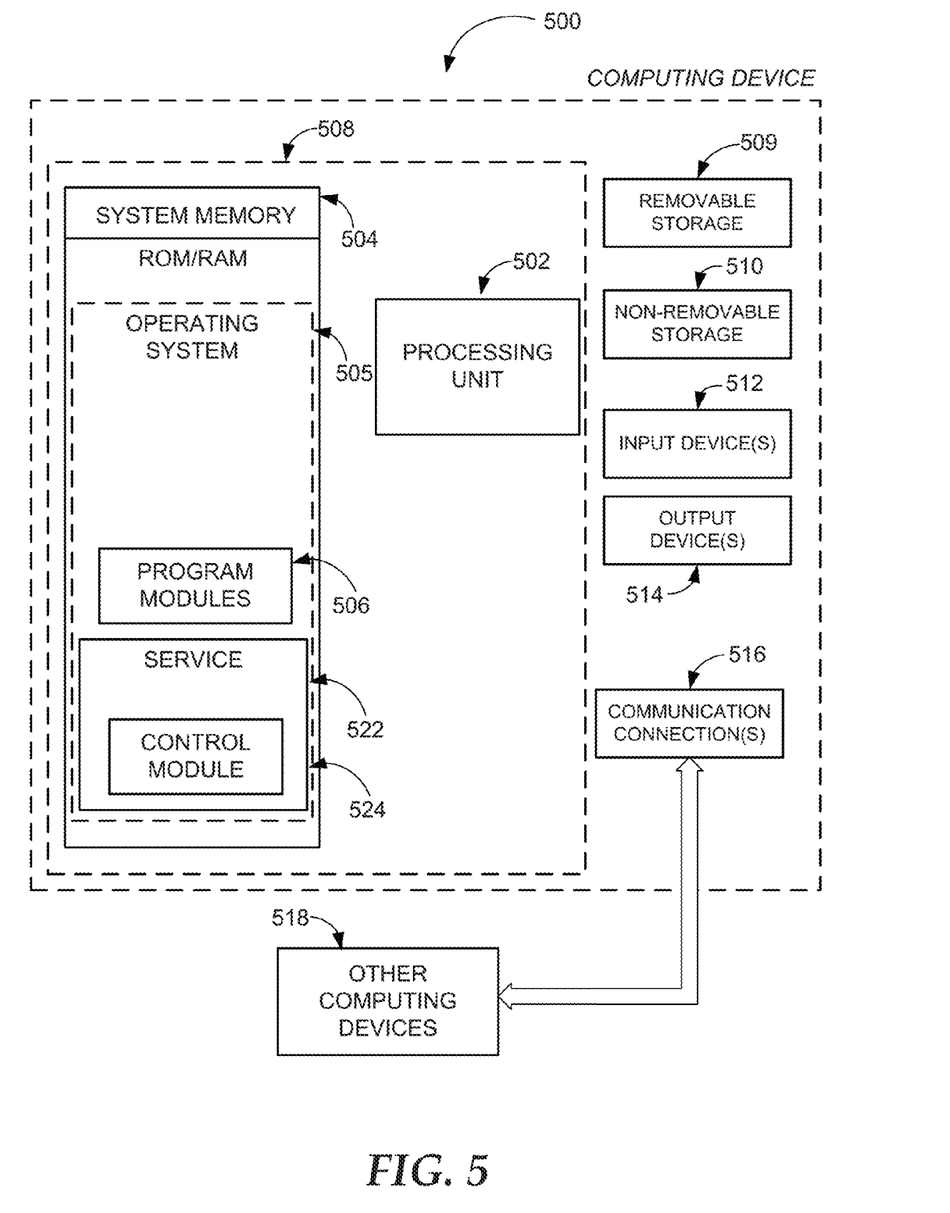
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a compliance application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, a service 522, and a control module 524.

The control module 524 of the service 522 may be responsible for compliance issues and activation or disabling of features and functionality, and may manage features and functionality based on input from independent controllers and provide a user experience displaying information associated with switch states, feature states, and history of changes. In some examples, pre-established profiles may be provided to a controller such as a compliance officer to make decisions by selection on his/her behalf at a particular level of risk acceptance and/or to meet a particular regulatory standard/certification. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
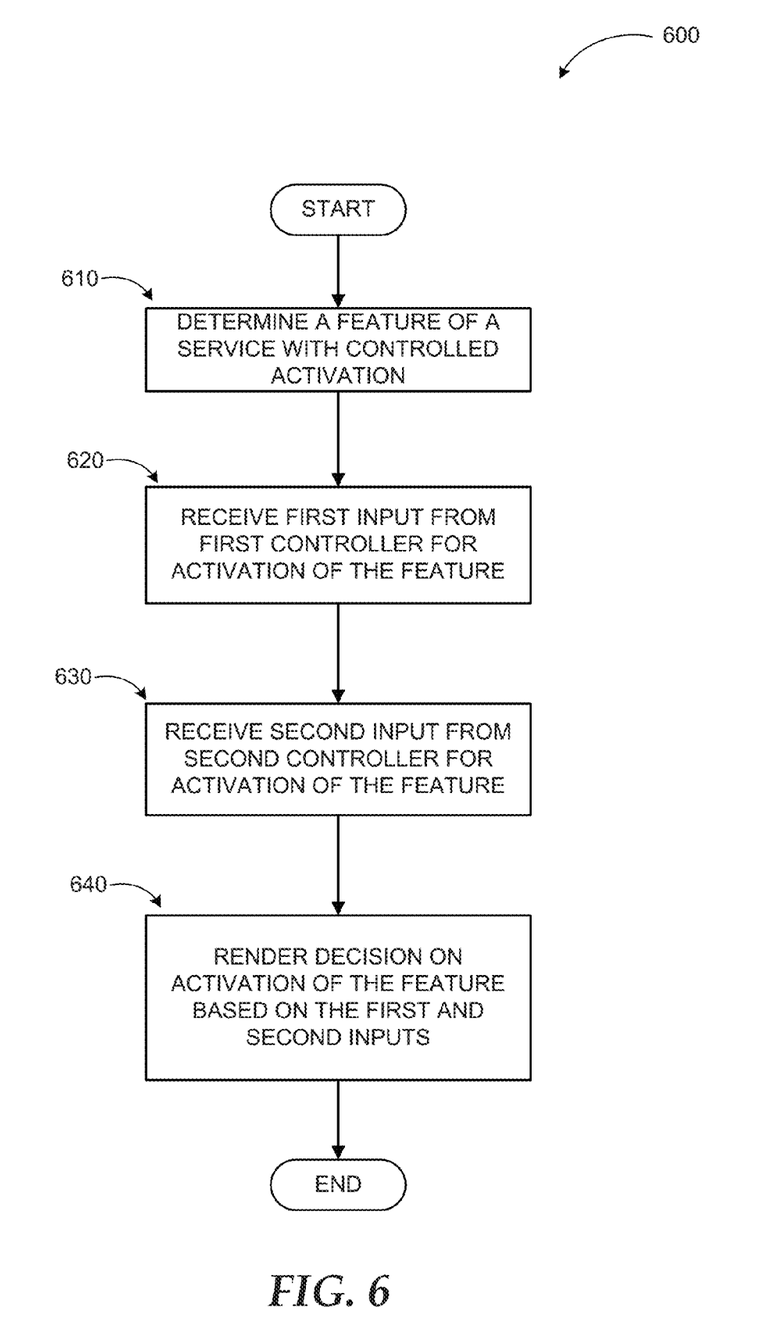
FIG. 6 illustrates a logic flow diagram for a process to provide control of activation of features or functionality by at least two parties according to embodiments.

FIG. 6 illustrates a logic flow diagram for a process to provide multiple-key feature toggling for compliance according to embodiments. Process 600 may be implemented on a compliance module of a cloud service.

Process 600 begins with operation 610, where the control module may determine a feature or a functionality of the service whose activation or disabling may be controlled by two or more people such as a compliance officer and a system administrator. At operation 620, the control module may receive a first input (switch on or off) from a first controller (e.g., the compliance officer) for the activation of the feature or functionality. At operation 630, the control module may receive a second input (switch on or off) from a second controller (e.g., the system administrator) for the activation of the same feature or functionality.

At operation 640, the control module may render a decision based on the first and second inputs whether the feature or functionality is to be activated. The control module may employ a logic function to render the decision such as an AND function. Other functions may also be used.

The operations included in process 600 are for illustration purposes. Compliance testing through sandbox environments n may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide multiple-key feature toggling for compliance in a service, the method comprising:
    determining a feature of the service with controlled activation;
    receiving a first input from a first controller for activation of the feature;
    applying a first weight to the first input based on a first role of the first controller;
    receiving a second input from a second controller for activation of the feature;
    applying a second weight to the second input based on a second role of the second controller; and
    rendering a decision on the activation of the feature based on the first weighted input and the second weighted input, wherein the decision further toggles one or more other features related to the feature on behalf of the second controller.

2. The method of claim 1, wherein determining the feature of the service with controlled activation comprises:
    determining whether the feature has a known impact on one or more of a compliance policy, a security policy, and a privacy policy of the service.

3. The method of claim 2, wherein the impact of the feature on one or more of the compliance policy, the security policy, and the privacy policy of the service is codified by a cloud service provider at one or more compliance controls.

4. The method of claim 1, further comprising:
    receiving a third input from a third controller for the activation of the feature;
    applying a third weight to the third input based on a role of the third controller; and
    rendering the decision on the activation of the feature based on the first weighted input, the second weighted input, and the third weighted input.

5. The method of claim 4, wherein rendering the decision on the activation of the feature comprises:
    employing a logic function to evaluate a combination of the first weighted input, the second weighted input, and the third weighted input.

6. The method of claim 1, further comprising:
    enabling a customer organization to decide which individuals are assigned controller roles.

7. The method of claim 1, further comprising:
    determining a number and/or types of controllers based on a type of the feature with controlled activation and a type of data that is impacted by the feature.

8. The method of claim 1, further comprising:
    determining an activated feature of the service;

receiving the first weighted input from the first controller for disabling of the activated feature;

receiving the second weighted input from the second controller for the disabling of the activated feature; and rendering a decision on the disabling of the activated feature based on the first weighted input and the second weighted input.

9. The method of claim 1, further comprising:

not activating the feature as a default decision if one of the first and second controllers provide non-affirmative input.

10. A computing device to provide multiple-key feature toggling for compliance in a cloud service, the computing device comprising:

a memory device configured to store instructions;

a processor coupled to the memory device, the processor executing a compliance control module of the cloud service in conjunction with the instructions stored in the memory device, wherein the compliance control module is configured to:

determine a feature of the cloud service with controlled activation;

receive a first input from a first controller for activation of the feature;

applying a first weight to the first input based on a first role of the first controller;

receive a second input from a second controller for activation of the feature;

applying a second weight to the second input based on a second role of the second controller;

employ a logic function to evaluate a combination of the first weighted input and the second weighted input; and render a decision on the activation of the feature based on a result of the evaluation, wherein the decision further toggles one or more other features related to the feature on behalf of the second controller.

11. The computing device of claim 10, wherein the compliance control module is further configured to:

present a user experience to the first controller and the second controller displaying states of features with controlled activation and states of switches to control the activation based on controller input.

12. The computing device of claim 11, wherein the user experience further displays notifications and records associated with controller inputs.

13. The computing device of claim 11, wherein the user experience includes a dashboard configured to display to the first controller when a switch for the second controller has been changed and when the feature has been activated.

14. The computing device of claim 10, wherein the logic function employed to evaluate the combination of the first weighted input and the second weighted input is configurable based on a customer input.

15. The computing device of claim 10, wherein the logic function employed to evaluate the combination of the first weighted input and the second weighted input is configurable based on a type of the feature and one or more of policies impacted by the feature.

16. The computing device of claim 10, wherein the feature has potential impact on one or more of a compliance policy, a security policy, and a privacy policy of the cloud service.

17. A computer-readable memory device with instructions stored thereon to provide multiple-key feature toggling for compliance in a cloud service, the instructions comprising:

determining a feature of the cloud service with controlled activation;

receiving ON or OFF inputs from the controllers for the activation of the feature;

applying one or more weights to the inputs based on one or more roles of the controllers;

employing a logic function to evaluate a combination of the weighted inputs;

rendering a decision on the activation of the feature based on a result of the combination; wherein the decision further toggles one or more other features related to the feature on behalf of the at least one of the plurality of controllers; and presenting a user experience to the plurality of controllers displaying states of features with controlled activation and states of switches to control the activation based on the controller inputs.

18. The computer-readable memory device of claim 17, wherein visibility of switch states and metadata associated with the switches is restricted based on one of the one or more roles of each of the controllers.

19. The computer-readable memory device of claim 17, wherein visibility of switch states and metadata associated with the switches is restricted for each controller based on types of the metadata.

* * * * *